United States Patent
Welsch et al.

(10) Patent No.: US 9,905,367 B2
(45) Date of Patent: Feb. 27, 2018

(54) METALLIC GLASS-ALLOYS FOR CAPACITOR ANODES

(71) Applicant: Case Western Reserve University, Cleveland, OH (US)

(72) Inventors: Gerhard E. Welsch, Cleveland, OH (US); Donald M. McGervey, Cleveland, OH (US); Dong Myoung Lee, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 220 days.

(21) Appl. No.: 14/713,843

(22) Filed: May 15, 2015

(65) Prior Publication Data

US 2016/0104579 A1   Apr. 14, 2016

Related U.S. Application Data

(60) Provisional application No. 61/993,748, filed on May 15, 2014.

(51) Int. Cl.
| | |
|---|---|
| *C22C 45/10* | (2006.01) |
| *H01G 9/042* | (2006.01) |
| *C22C 1/00* | (2006.01) |
| *H01G 9/00* | (2006.01) |

(52) U.S. Cl.
CPC ............ *H01G 9/042* (2013.01); *C22C 1/002* (2013.01); *C22C 45/10* (2013.01); *H01G 9/0029* (2013.01)

(58) Field of Classification Search
None
See application file for complete search history.

(56) References Cited

U.S. PATENT DOCUMENTS

| | | |
|---|---|---|
| 4,050,931 A | 9/1977 | Tanner et al. |
| 6,226,173 B1 | 5/2001 | Welsch et al. |
| 6,914,769 B2 | 7/2005 | Welsch et al. |
| 6,945,021 B2 | 9/2005 | Michel |
| 7,368,023 B2 | 5/2008 | Chang |
| 7,486,498 B2 | 2/2009 | Welsch et al. |
| 7,923,067 B2 * | 4/2011 | Muramatsu ............ C25D 11/26 427/215 |
| 7,998,286 B2 | 8/2011 | Wiest |
| 8,333,850 B2 * | 12/2012 | Gong ..................... C22C 1/002 148/403 |
| 8,501,087 B2 | 8/2013 | Schroers et al. |
| 8,518,193 B2 | 8/2013 | Duan |

FOREIGN PATENT DOCUMENTS

CN           104419880 A  *  3/2015

OTHER PUBLICATIONS

English Translation of CN 104419880 from Espacenet, published Mar. 18, 2015.*
Fan, C. et al., "Deformation behavior of Zr-based bulk nanocrystalline amorphous alloys", Physical Review B, vol. 61, No. 6, Feb. 2000, pp. R3761-R3763.*

* cited by examiner

*Primary Examiner* — George Wyszomierski
(74) *Attorney, Agent, or Firm* — Tarolli, Sundheim, Covell & Tummino LLP

(57) ABSTRACT

A metallic glass formed from a Be-containing alloy near eutectic composition has the chemical formula:

$(M_{1-a}X_a)_b Be_c Y_d Z_e$ wherein M is Ti, Zr, Ta, or Hf; X is Nb, Ta, or Hf; X is not same element as M; Y is at least one of Ti, Zr, Ta, Nb, or Hf; and Y is not the same element as M and/or X.

19 Claims, 12 Drawing Sheets

Ti-Nb-Be

1. Be45-Ti20-Nb35
   0.879 / 2.075 / 7.046
2. Be45-Ti35-Nb20
   1.029 / 4.254 / 4.717
3. Be25-Ti50-Nb25
   0.456 / 4.844 / 4.700

Ti-Ta-Be

1. Be 40-Ti 20-Ta 40
   0.421 / 1.119 / 8.459
2. Be 50-Ti 30-Ta 20
   0.818 / 2.609 / 6.573
3. Be 25-Ti 50-Ta 25
   0.315 / 3.352 / 6.333

Zr-Ta-Be

METALLIC GLASS-ALLOYS FOR CAPACITOR ANODES

RELATED APPLICATION

This application claims priority from U.S. Provisional Application No. 61/993,748, filed May 15, 2014, the subject matter of which is incorporated herein by reference in its entirety.

TECHNICAL FIELD

The present invention relates to electrolytic capacitor anodes formed from metallic glass alloys and to their use in energy storage devies.

BACKGROUND

Electrical devices, such as power supplies, switching regulators, motor control-regulators, computer electronics, audio amplifiers, surge protectors, and resistance spot welders often require substantial bursts of energy in their operation. Capacitors are energy storage devices that are commonly used to supply these energy bursts by storing energy in a circuit and delivering the energy upon timed demand.

Typically, capacitors consist of two electrically conducting plates, referred to as the anode and the cathode, which are separated by a dielectric film. In order to produce capacitors with high energy storage, the dielectric films where the electrical charge is stored, have a high capacitance and voltage and a low leakage current. $Al_2O_3$, $TiO_2$, $TiCaO_3$, $Ta_2O_5$, and $Nb_2O_5$ are oxides with a high capacitance that have been commercialized for capacitors. In general, these oxides are utilized by sintering fine powders, which are in a crystalline phase.

Crystalline ceramic capacitors are limited by breakdown failure at small fractions of their 'theoretical' dielectric strength, and to a lesser degree, by low value of dielectric constant because crystalline ceramics have line- and boundary-defects that are not repairable. They can operate at electric fields that are at most 1% to 5% of 'theoretical'.

Capacitors employing anode base metals, such as Al, Ti, Ta, and Nb, can be anodized in electrolyte and form an anodic oxide. The anodic oxides can form anodic dielectrics having structural homogeneity at the atomic level, as in a glass, and therefore can have low-leakage current. In oxidizing electrolyte, anode base metals have the ability to self-repair up to certain thicknesses. This can determine the upper voltage limitation (e.g., several hundred Volt) of an electrolytic capacitor. Up to such voltage effective self-repair is possible so that such capacitors can work reliably at high energy density.

It is desirable to improve a dielectric's operating field strength E in the energy density formula (½ $\in_o \in \bar{E}^2$), where $\in_o$ is the permittivity of vacuum, $\in$ is the dielectric constant and $\bar{E}$ is the electrical field strength.

High electric field strength-requires elimination of all E-reducing defects in a dielectric. This means removal of geometrical, structural and chemical defects throughout the entire dielectric. According to U.S. Pat. No. 5,211,832, and U.S. Pat. No. 6,755,959, a high operating field can be achieved only when there is effective self-repair of defects that may arise in the dielectric, otherwise leakage current can turn into a spark and a short-circuit path through the dielectric. To enable anodic self-repair, volume defects (pores, tensile-strained regions), area defects (grain or phase boundaries), line defects (dislocations) and point defects (impurity atoms, vacancies, interstitials) must be absent. Materials that come close to this requisite are oxide glasses, an example of which is anodic $Ta_2O_5$ dielectric. Even then, atomic defects cannot be eliminated entirely, but anodic repair can be effective in neutralizing defects as long as the defects are small and few.

In order to achieve homogenous glassy anodic film, the microstructure of the substrate to be anodized should also be homogenous. Best homogeneity is obtained in glass materials. The elimination of microscopic and macroscopic defects in the dielectric as well as in the substrate is important. Anodizing at DC voltages forms a uniform dielectric film on Al, Ti, Nb, and Ta metals. If the substrate material has defects, which are typically found in a common metal, the anodic film on those local defects could have inhomogeneities and/or discontinuities. Anodizing a substrate with few and small defects, for example a nanometer-grained nano-scale or amorphous phase, enables the formation of an oxide dielectric, which has a continuous and nearly perfect film over the whole surface.

SUMMARY

Embodiments described herein relate to electrolytic capacitor anodes formed from glass forming Be alloy compositions and to the use of the electrolytic capacitor anodes for energy storing applications. The Be alloy compositions can upon rapid solidification processes form a glass with a substantially homogeneous amorphous phase. An anodic oxide film can be formed on a substrate of the amorphous Be alloy compositions that is dense, defect-free (continuous), and has a uniform thickness. The anodic oxide film can serve as a dielectric in electrolytic capacitors, advantageously providing high specific energy storage and low current leakage per unit area.

In some embodiments, the Be alloy composition can be a metallic glass formed from a Be-containing alloy near eutectic composition having the chemical formula:

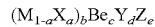

$(M_{1-a}X_a)_b Be_c Y_d Z_e$ wherein M is Ti, Zr, Ta, or Hf;
X is Nb, Ta, or Hf; X is not same element as M;
Y is at least one of Ti, Zr, Ta, Nb, or Hf;
Y is not the same element as M and/or X; and
Z is at least one additive element,
where a is an atomic fraction of a whole and between about 0.1 and about 0.9
b is about 35 atomic % to about 80 atomic %,
c is about 20 atomic % to about 65 atomic %,
d is between 0 and about 10 atomic %, and
e is between 0 and about 10 atomic %.

In other embodiments, Z is at least one of Si, W, V, or Mo. In still other embodiments, M is Ti and X is Nb, Ta, or HF; M is Zr and X is Nb, Ta, or Hf; or M is Ta and X is Nb or Hf.

In some embodiments, the metallic can be made from a homogeneous melt by a rapid solidification process into the form of ribbon-shaped capacitor anodes.

In other embodiments, the metallic glass can be made by physical vapor deposition of the alloy elements and serve as an anode of energy-dense electrolytic capacitors.

In still other embodiments, the metallic glass can be made in a thin film form by sputter-deposition and serve as an anode of energy-dense electrolytic capacitors.

In other embodiments, the metallic glass can be made in the form of surface-enhanced plates and serve as an anode of energy-dense electrolytic capacitors.

DESCRIPTION

Embodiments described herein relate to electrolytic capacitor anodes formed from glass forming Be alloy compositions and to the use of the electrolytic capacitor anodes for energy storing applications. The Be alloy compositions can upon rapid solidification processes form a glass with a substantially homogeneous amorphous phase. An anodic oxide film can be formed on a substrate of the amorphous Be alloy compositions that is dense, defect-free (continuous), and has a uniform thickness. The anodic oxide film can serve as a dielectric in electrolytic capacitors, advantageously providing high specific energy storage, low current leakage per unit area, and the ability of self-repair in the event of a breakdown in the dielectric film.

Figure 1:
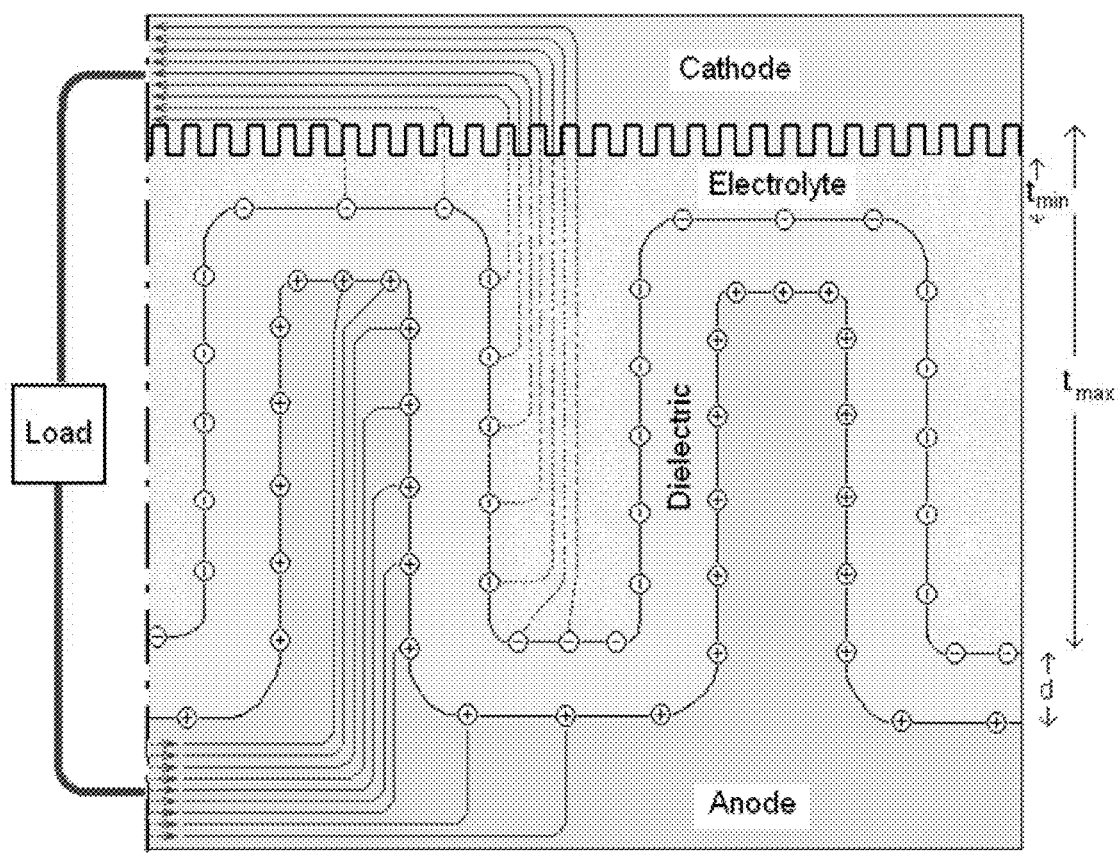
FIG. 1 is a schematic illustration of a capacitor in accordance with an embodiment.

By way of example, FIG. 1 shows a portion of an exemplary capacitor which includes an anode and a cathode. The anode includes a substrate formed of the Be containing alloy described herein and a film of a dielectric material adhering to a surface of the substrate. The dielectric film can be an oxide of the Be containing alloy, which forms the substrate. An electrolyte optionally spaces the dielectric material from the cathode. The electrolyte may be liquid or solid, e.g. an acid such as $H_3PO_4$ or other suitable current carrying material as disclosed, for example, in U.S. application Ser. No. 09/914,517, filed on Apr. 29, 2002, and U.S. application Ser. No. 10/182,927, filed on Aug. 2, 2002, the disclosures of which are incorporated herein by reference in their entireties.

In accordance with one embodiment, when substrate materials to be anodized are a glass (amorphous) or a nano-crystalline phase, the anodic film will be uniform because they do not have defects or have only few self-repairable defects in their microstructure. Rapid solidification processing (RSP), such as melt spinning or gas-atomization is a well-known method to make amorphous glass or a nearly amorphous nanocrystalline phase material. If materials with a high dielectric constant are rapidly solidified and they have a homogenous microstructure, anodic oxide on them will then also be homogenous.

Ti, Ta, Nb, and Zr are the conventional capacitor materials on which to form anodic oxide dielectric films. They have high melting temperatures. This technically limits fabrication of RSP-ed preforms. Low-melting property is one of the favorable factors to produce homogenous preforms by RSP. Making alloy compositions complex is another factor to form amorphous alloy. Accordingly, multi-component alloy systems with low-melting temperature tend to have high glass forming ability, which are well-known in the amorphous alloy research field.

It was found that Be-containing Ti, Ta, Nb, and Zr alloys can form anodic dielectric oxides. Be greatly decreases the melting temperatures of Ti, Ta, Nb, and Zr, therefore Be-containing alloys containing one or more of these elements can be easily rapid-solidified and are good glass formers.

In some embodiments, the Be alloy compositions can be a near eutectic composition having the chemical formula:

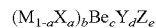

$$(M_{1-a}X_a)_b Be_c Y_d Z_e$$

wherein M is Ti, Zr, Ta, or Hf;
X is Nb, Ta, or Hf; X is not same element as M;
Y is at least one of Ti, Zr, Ta, Nb, or Hf;
Y is not the same element as M and/or X; and
Z is at least one additive element,
where a is an atomic fraction of a whole and between about 0.1 and about 0.9
b is about 35 atomic % to about 80 atomic %,
c is about 20 atomic % to about 65 atomic %,
d is between 0 and about 10 atomic %, and
e is between 0 and about 10 atomic %.

In some embodiments, M is Ti and X is Nb, Ta, or HF; M is Zr and X is Nb, Ta, or Hf; or M is Ta and X is Nb or Hf.

In other embodiments, Z is at least one of Si, W, V, or Mo. Tungsten suppresses oxygen gas bubbles in anodic oxide and silicon stabilizes a glass oxide. Both elements improve the properties of anodic oxides that are formed on a crystalline substrate. It is therefore expected that they also improve the properties of anodic oxides grown on amorphous substrates.

In still other embodiments, the Be containing alloy with near-eutectic compositions, can have the chemical formulae:

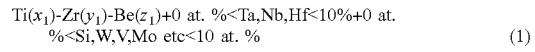

Ti($x_1$)-Zr($y_1$)-Be($z_1$)+0 at. %<Ta,Nb,Hf<10%+0 at. %<Si,W,V,Mo etc<10 at. %     (1)

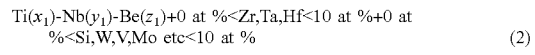

Ti($x_1$)-Nb($y_1$)-Be($z_1$)+0 at %<Zr,Ta,Hf<10 at %+0 at %<Si,W,V,Mo etc<10 at %     (2)

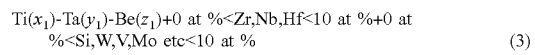

Ti($x_1$)-Ta($y_1$)-Be($z_1$)+0 at %<Zr,Nb,Hf<10 at %+0 at %<Si,W,V,Mo etc<10 at %     (3)

$Zr(x_1)\text{-}Ta(y_1)\text{-}Be(z_1)+0 \text{ at \%} < Ti,Nb,Hf < 10 \text{ at \%} + 0 \text{ at \%} < Si,W,V,Mo \text{ etc} < 10 \text{ at \%}$ (4)

$Zr(x_1)\text{-}Nb(y_1)\text{-}Be(z_1)+0 \text{ at \%} < Ti,Ta,Hf < 10 \text{ at \%} + 0 \text{ at \%} < Si,W,V,Mo \text{ etc} < 10 \text{ at \%}$ (5)

$Ta(x_1)\text{-}Nb(y_1)\text{-}Be(z_1)+0 \text{ at \%} < Ti,Zr,Hf < 10 \text{ at \%} + 0 \text{ at \%} < Si,W,V,Mo \text{ etc} < 10 \text{ at \%}$ (6)

$Zr(x_1)\text{-}Hf(y_1)\text{-}Be(z_1)+0 \text{ at \%} < Ti,Ta,Nb < 10 \text{ at \%} + 0 \text{ at \%} < Si,W,V,Mo \text{ etc} < 10 \text{ at \%}$ (7)

$Ta(x_1)\text{-}Nb(y_1)\text{-}Be(z_1)+0 \text{ at \%} < Ti,Zr,Hf < 10 \text{ at \%} + 0 \text{ at \%} < Si,W,V,Mo \text{ etc} < 10 \text{ at \%}$ (8)

$Ta(x_1)\text{-}Hf(y_1)\text{-}Be(z_1)+0 \text{ at \%} < Ti,Zr,Nb < 10 \text{ at \%} + 0 \text{ at \%} < Si,W,V,Mo \text{ etc} < 10 \text{ at \%}$ (9)

$Nb(x_1)\text{-}Hf(y_1)\text{-}Be(z_1)+0 \text{ at \%} < Ti,Nb,Hf < 10 \text{ at \%} + 0 \text{ at \%} < Si,W,V,Mo \text{ etc} < 10 \text{ at \%}$ (10)

wherein $x_1$ is about 5 at. % to about 60% at. $y_1$ is about 5 at. % to about 60 at. %, and $z_1$ is about 20 at. % to about 65 at. %.

In yet other embodiments, the Be containing alloy with near-eutectic compositions, can have the chemical formulae defined by the an area identified in the ternary diagrams shown in FIGS. 6-14.

Although the range of elements used to form the Be containing alloy with near-eutectic compositions can be defined in various ways, as described above, it should be understood that the composition ranges are formed into metallic glasses with relatively higher or lower cooling rates. Moreover, although the alloy composition ranges are defined by reference to a ternary system such as that illustrated in FIGS. 6-14, the boundaries of the alloy ranges may vary somewhat as different materials are introduced. Regardless, the boundaries of the current invention encompass only those alloys which form an amorphous material (greater than 50%, 60%, 70%, 80%, 90%, 95%, or 99% by volume amorphous phase) when cooled from the melting temperature to a temperature below the glass transition temperature at a cooling rate that allows for the formation of amorphous pieces that can be used to provide anode substrates.

In some embodiments, the Be alloy gloss can be made from a homogeneous melt by a rapid solidification process into the form of ribbon-shaped capacitor anodes.

In other embodiments, the Be alloy glass can be made by physical vapor deposition of the alloy elements and serve as an anode of energy-dense electrolytic capacitors.

In still other embodiments, the Be alloy glass can be made in a thin film form by sputter-deposition and serve as an anode of energy-dense electrolytic capacitors.

In other embodiments, the metallic glass can be made in the form of surface-enhanced plates and serve as an anode of energy-dense electrolytic capacitors.

In some embodiments, the Be containing alloy composition is one which can be anodized to grow a dielectric film which comprises a mixed, alloyed, or doped oxide. Such oxides can have high dielectric strength and high dielectric constants, ranging from about 25 to over 10,000, in order to achieve very high energy density. The composition, processing and microstructure of the substrate Be containing alloy can be chosen to achieve the growth of an adherent anodic oxide film with high dielectric strength and low leakage current. When anodized, the alloy yields oxide molecules of high dielectric constant that are either embedded in the anodic oxide film, or form one or more layers in the anodic oxide film, or form a mixed oxide or an oxide alloy.

Figure 2:
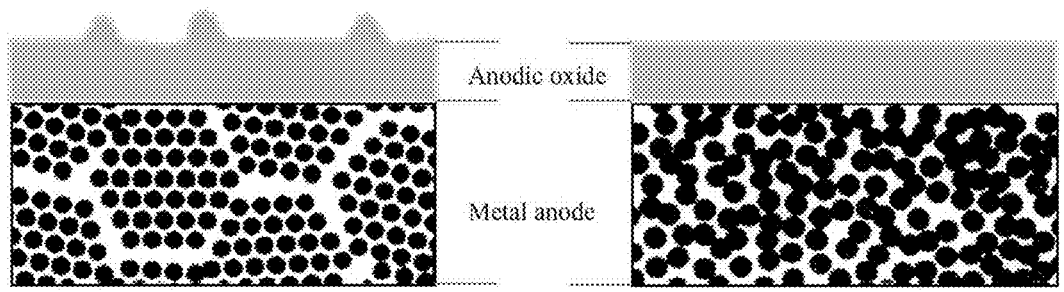
FIG. 2 is a schematic illustration comparing anodic oxide formed on a crystalline metal anode and an amorphous metal glass anode.
Figure 3:
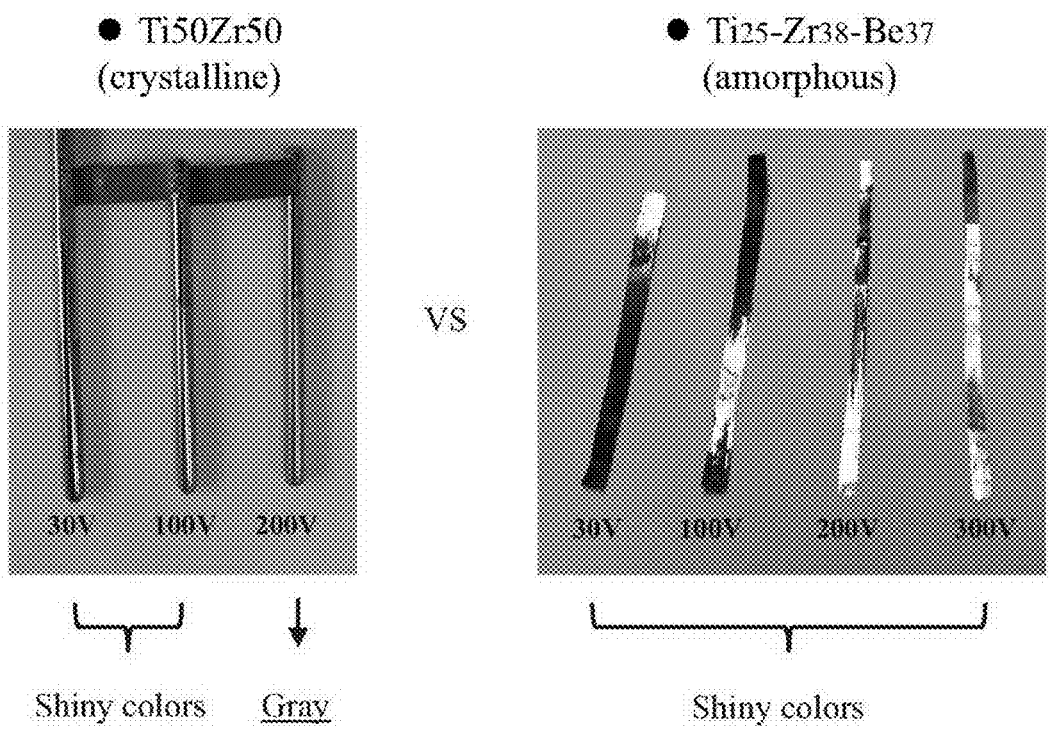
FIG. 3 illustrates images comparing anodic oxide formed on a crystalline metal anode and an amorphous metal glass anode.
Figure 4:
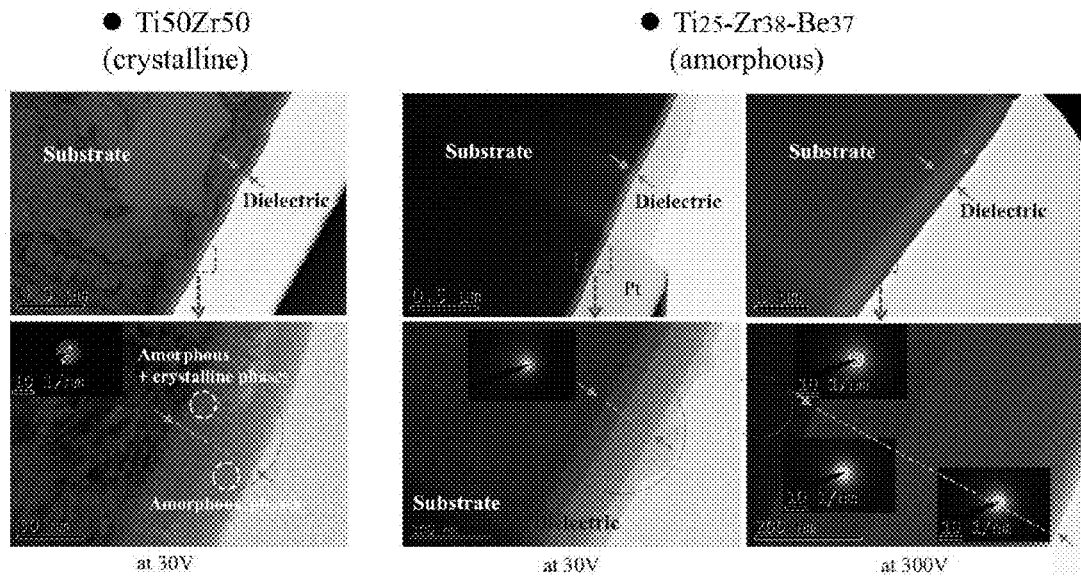
FIG. 4 illustrates images comparing uniformity of oxide films formed on on a crystalline metal anode and an amorphous metal glass anode.

FIG. 2 is a schematic illustration comparing anodic oxide films formed on a crystalline metal substrate and an amorphous metal glass substrates. As can be seen from the schematic, anodic oxide films formed on crystalline metal substrates can have an irregular surface geometry, whereas anodic oxide films formed on amorphous Be alloy glass substrates have a continuous and uniform thickness. The continuous and uniform thickness of the anodic oxide films formed Be alloy glass substrates is further illustrated in FIG. 3. FIG. 3 illustrates images comparing anodic oxide formed on a crystalline metal wires and amorphous Be alloy glass wires. The gray color of the crystalline metal wires is evidence of rough an uneven oxide formation; whereas the shiny color of the Be alloy glass wires is evidence of a continuous and uniform anodic oxide film coating. FIG. 4 further illustrates images comparing uniformity of oxide films formed on a crystalline metal substrate and an amorphous Be glass substrate.

EXAMPLE

Examples 1-3 in Table 1 show the capacitance density and leakage current density of anodic oxide films grown on amorphous alloy-glass ribbons made by melt-spinning and on sputter-deposited Ta and Nb-sheet reference materials.

TABLE 1

| | Anode Material/ Alloy | Capacitance per unit area of 30 V-Formed Anodic Oxide ($\mu F/cm^2$) | Leakage current density, $\mu A/cm^2$ and [in italics] normalized leakage current, $\mu A/\mu FV$ at measurement voltages of | | | | | |
|---|---|---|---|---|---|---|---|---|
| | | | 3 V | 5 V | 10 V | 15 V | 20 V | 30 V |
| Example 1 | Ti25—Zr38—Be37 Alloy (melt-spun ribbon) | 0.357 | 0.000 [0.000] | 0.005 [0.003] | 0.016 [0.004] | 0.023 [0.004] | 0.037 [0.005] | 1.446 [0.135] |
| Example 2 = Ta— Comparison Example | Pure Tantalum (sputter-deposited layer) | 0.500 | 0.000 [0.000] | 0.003 [0.000] | 0.003 [0.002] | 0.006 [0.002] | 0.009 [0.002] | 0.053 [0.009] |
| Example 3 = Nb— Comparison Example | Pure Niobium (1 mm thick sheet) | 0.394 | 0.011 [0.009] | 0.032 [0.016] | 0.038 [0.010] | 0.041 [0.007] | 0.057 [0.007] | 0.254 [0.021] |

Table 2 shows the dielectric properties of additional anodized Ti—Zr—Be alloy samples for anodization voltages up to 300 Volt. The values of capacitance per unit area and of normalized leakage current (*) are measured at each anodizing voltage and at de-rated voltages. In practical applications of electrolytic capacitors the anodized samples are often used at de-rated voltages, i.e., at voltages that are smaller than the anodizing voltage in order to cut down their leakage current and risk of failure.

Dielectric properties of various thickness oxide films formed by anodizing at 3 to 300 Volt on Ti—Zr—Be near-eutectic metallic glass alloy ribbons. The oxide dielectric films were formed:

at anodizing voltages ranging from 3 to 300V
in electrolyte of 1% $H_3PO_4$+distilled water
with upper current density limited to 20 mA per square centimeter
forming times=24 hours.

Summary 1. capacitance density is increased about 20% without increasing leakage current

| Alloy | Capacitance ($\mu F$/cm2) @ 6 V | Leakage current [$\mu A/cm2$] at voltage | | | | | |
|---|---|---|---|---|---|---|---|
| | | Normalized leakage current [$\mu A/\mu FV$] | | | | | |
| | | 3 V | 5 V | 10 V | 15 V | 20 V | 30 V |
| As-spun | 0.357 | 0.000 | 0.005 | 0.016 | 0.023 | 0.037 | 1.446 |
| | | 0.000 | 0.003 | 0.004 | 0.004 | 0.005 | 0.135 |
| Pressed | 0.418 | 0.001 | 0.009 | 0.026 | 0.050 | 0.075 | 0.180 |
| | | 0.001 | 0.004 | 0.006 | 0.008 | 0.009 | 0.014 |

Figure 5:
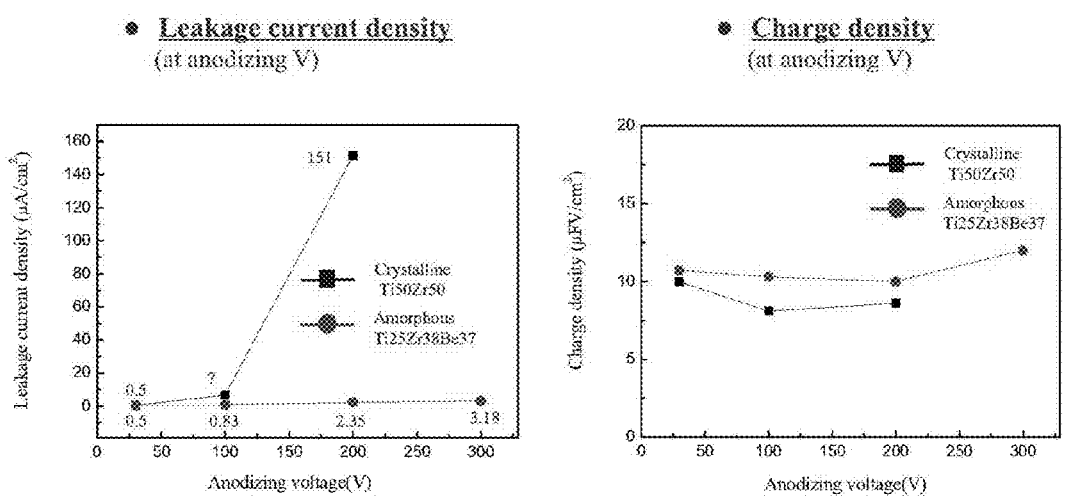
FIG. 5 illustrates plots comparing leakage current density and charge density of anodes formed from crystalline metal and an amorphous metal glass anode.
Figure 6:
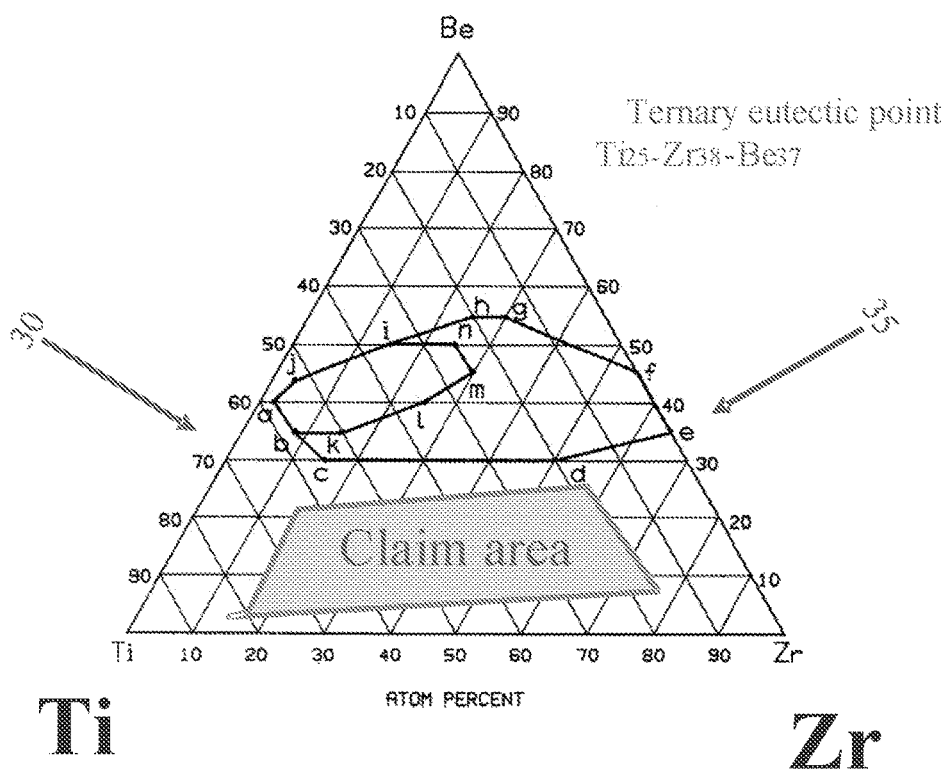
FIG. 6 is a ternary phase diagram showing the ternary eutectic point of a Ti—Zr—Be alloy in accordance with an embodiment.
Figure 7:
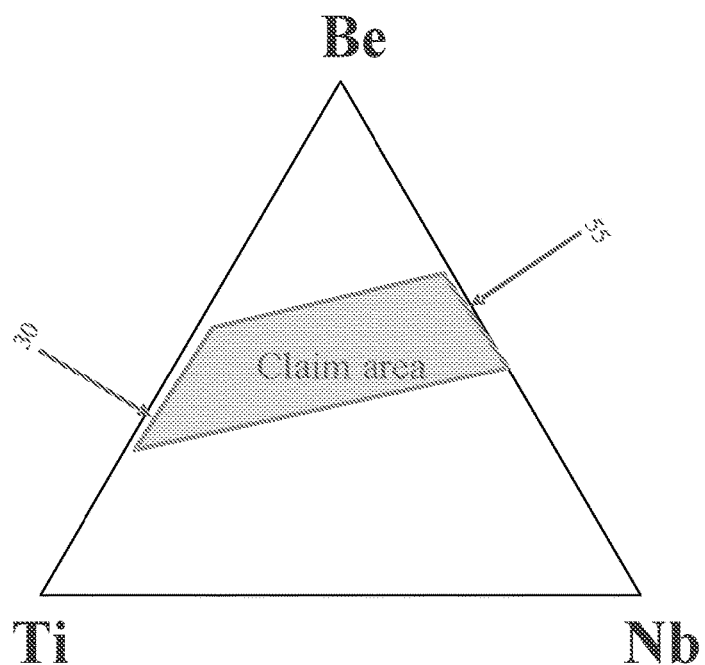
FIG. 7 is a ternary phase diagram showing the ternary eutectic point of a Ti—Nb—Be alloy in accordance with an embodiment.
Figure 8:
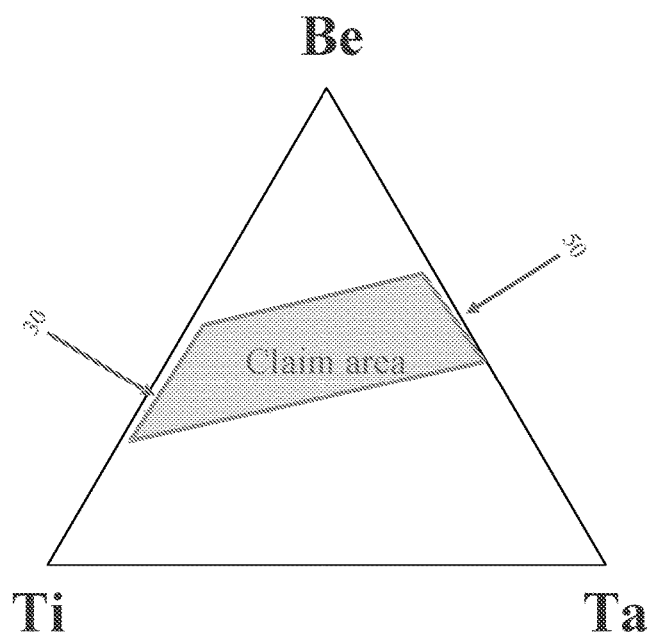
FIG. 8 is a ternary phase diagram showing the ternary eutectic point of a Ti—Ta—Be alloy in accordance with an embodiment.
Figure 9:
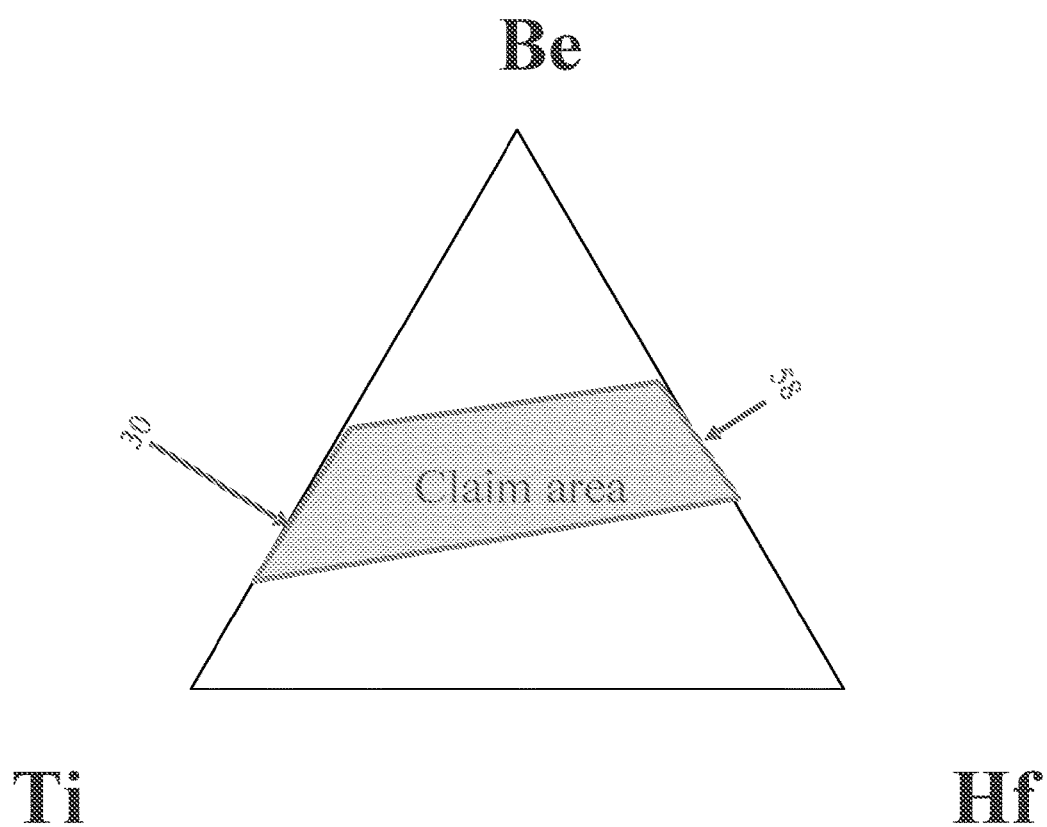
FIG. 9 is a ternary phase diagram showing the ternary eutectic point of a Ti—Hf—Be alloy in accordance with an embodiment.
Figure 10:
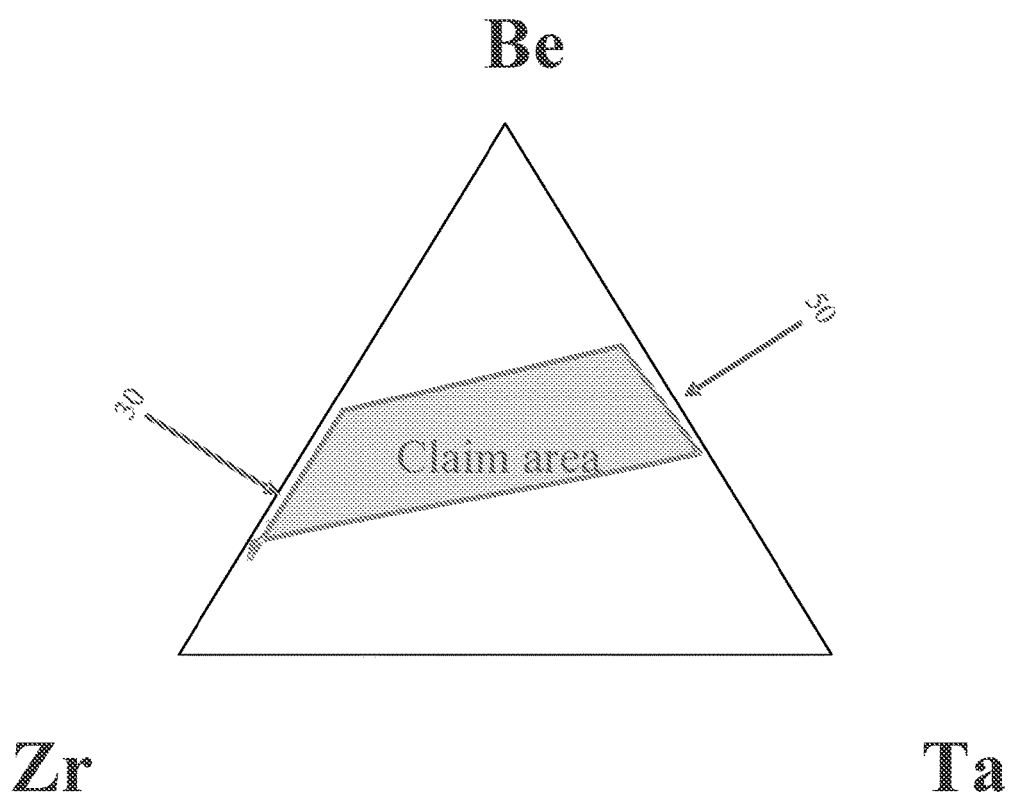
FIG. 10 is a ternary phase diagram showing the ternary eutectic point of a Zr—Ta—Be alloy in accordance with an embodiment.
Figure 11:
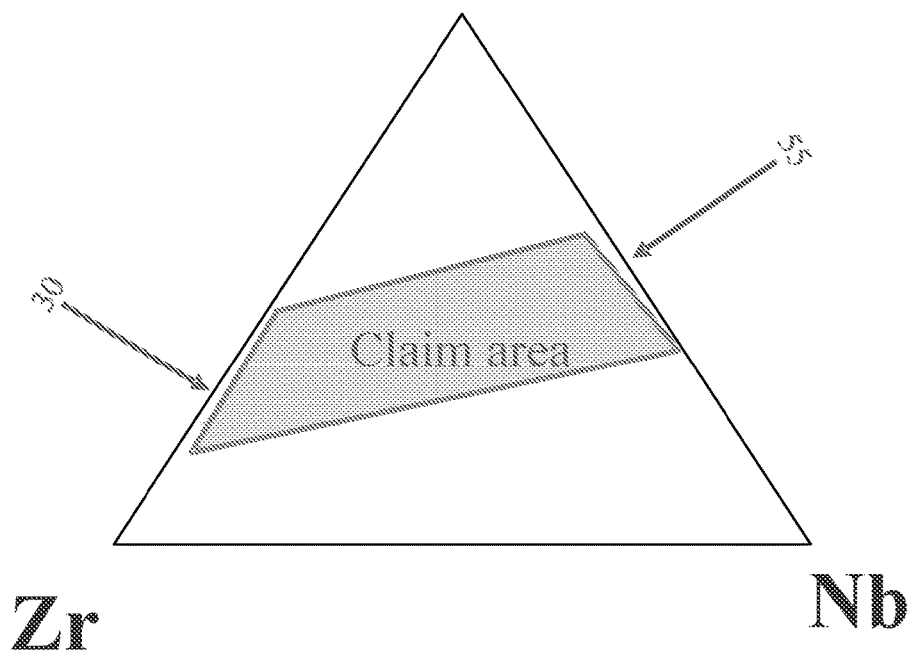
FIG. 11 is a ternary phase diagram showing the ternary eutectic point of a Zr—Nb—Be alloy in accordance with an embodiment.
Figure 12:
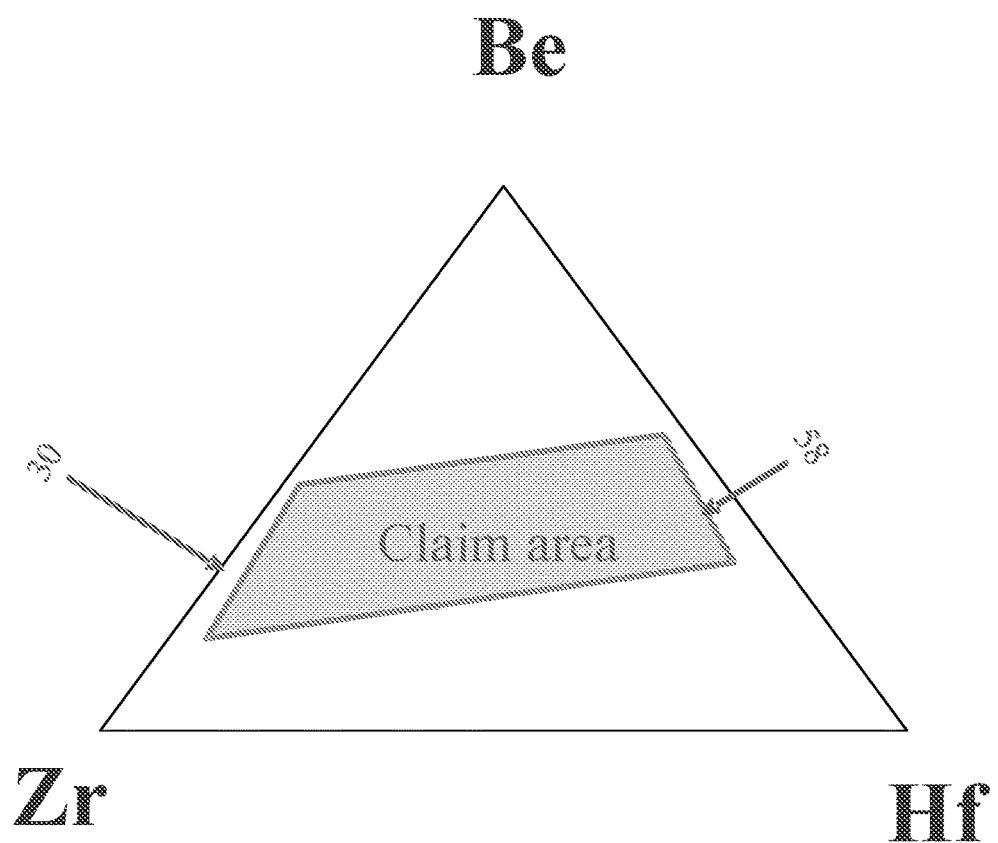
FIG. 12 is a ternary phase diagram showing the ternary eutectic point of a Zr—Hf—Be alloy in accordance with an embodiment.
Figure 13:
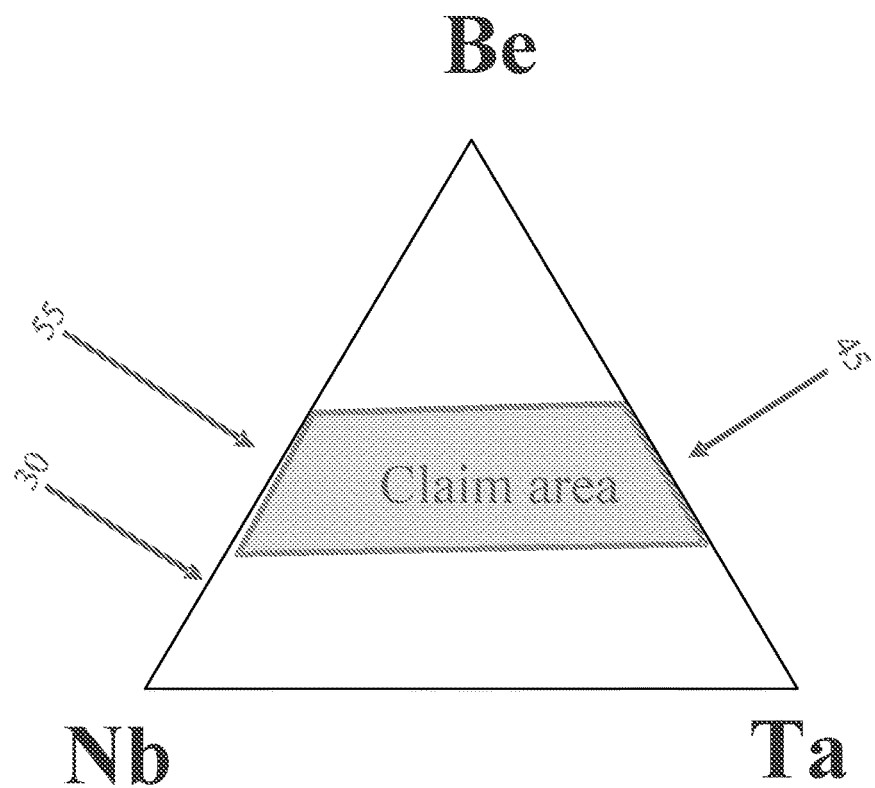
FIG. 13 is a ternary phase diagram showing the ternary eutectic point of a Ta—Nb—Be alloy in accordance with an embodiment.
Figure 14:
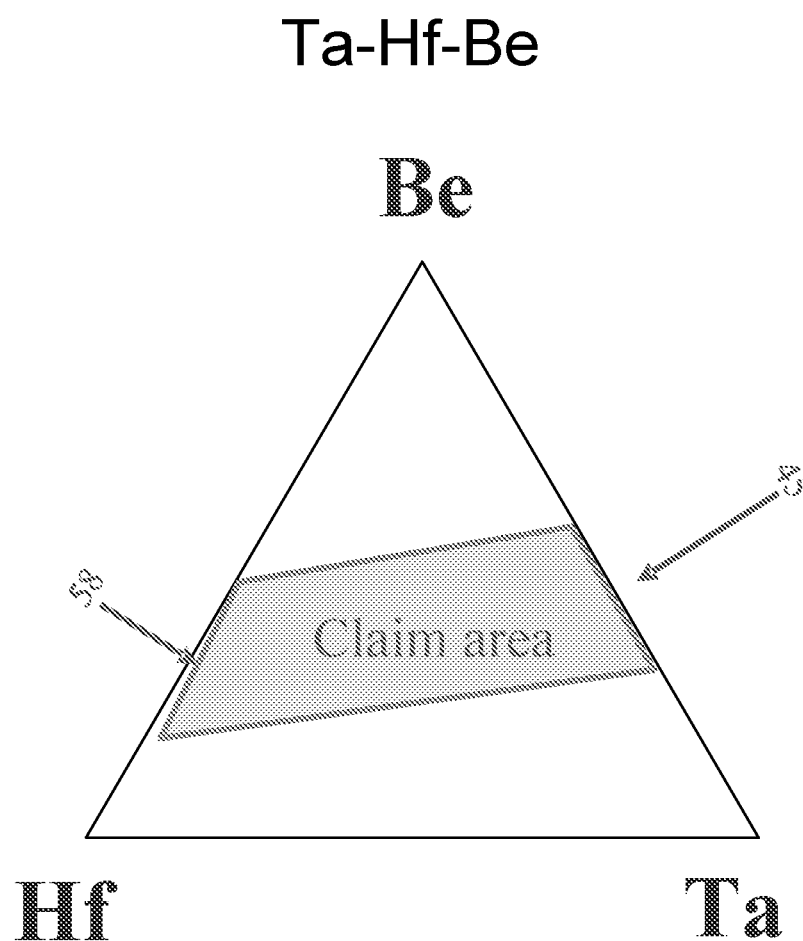
FIG. 14 is a ternary phase diagram showing the ternary eutectic point of a Ta—Hf—Be alloy in accordance with an embodiment.

FIG. 5 illustrates plots comparing leakage current density and charge density of anodes formed from crystalline metal and an amorphous metal glass anode.

It is, therefore, an object of the present invention to provide Be-containing alloys that form metallic glass anodes; these form anodic dielectric oxides have excellent performance capabilities as capacitor dielectrics and have low leakage currents compared with to anodic oxides on conventional anode metals used to form electrolytic capacitors. Therefore, the low-melting eutectic and the low-melting near-eutectic Be-containing alloys have good industrial and economical applicability for making anodes of electrolytic capacitors with enhanced usefulness, performance and practicality in applications in which energy density, power and reliability are desired.

While this invention has been particularly shown and described with references to preferred embodiments thereof, it will be understood by those skilled in the art that various changes in form and details may be made therein without departing from the scope of the invention encompassed by the appended claims. All patents, publications and references cited in the foregoing specification are herein incorporated by reference in their entirety.

Having described the invention, the following is claimed:

1. A metallic glass formed from a Be-containing alloy near eutectic composition having the chemical formula:

$$(M_{1-a}X_a)_b Be_c Y_d Z_e$$

wherein M is Ti, Zr, Ta, or Hf;
X is Nb, Ta, or Hf; X is not same element as M;
Y is at least one of Ti, Zr, Ta, Nb, or Hf;
Y is not the same element as M and/or X; and
Z is at least one of Si, W, V, or Mo,
where a is an atomic fraction of a whole and between about 0.1 and about 0.9
b is about 35 atomic % to about 80 atomic %,
c is about 20 atomic % to about 65 atomic %,
d is between 0 and about 10 atomic %, and
e is an amount between 0 and about 10 atomic %.

2. The metallic glass of claim 1, wherein M is Ti and X is Nb, Ta, or Hf.

3. The metallic glass of claim 1, wherein M is Zr and X is Nb, Ta, or Hf.

4. The metallic glass of claim 1, wherein M is Ta and X is Nb or Hf.

5. The metallic glass of claim 1, being made from a homogeneous melt by a rapid solidification process into the form of ribbon-shaped capacitor anodes.

6. The metallic glass of claim 1, being made by physical vapor deposition of the alloy elements and serving as anodes of electrolytic capacitors.

7. The metallic glass of claim 1, being made in thin film form by sputter-deposition and serving as anodes of electrolytic capacitors.

8. The metallic glass of claim 1, being made in the form of plates and serving as anodes of electrolytic capacitors.

9. An anode for an electrolytic capacitors comprising a homogenous metallic glass alloy having the chemical formula:

$$(M_{1-a}X_a)_b Be_c Y_d Z_e$$

wherein M is Ti, Zr, Ta, or Hf;
X is Nb, Ta, or Hf; X is not same element as M;
Y is at least one of Ti, Zr, Ta, Nb, or Hf;
Y is not the same element as M and/or X; and
Z is at least one of Si, W, V, or Mo,
where a is an atomic fraction of a whole and between about 0.1 and about 0.9
b is about 35 atomic % to about 80 atomic %,
c is about 20 atomic % to about 65 atomic %,
d is between 0 and about 10 atomic %, and
e is an amount between 0 and about 10 atomic %.

10. The anode of claim 9, wherein M is Ti and X is Nb, Ta, or HF.

11. The anode of claim 9, wherein M is Zr and X is Nb, Ta, or Hf.

12. The anode of claim 9, wherein M is Ta and X is Nb or Hf.

13. The anode of claim 9, having a ribbon-shape and being made from a homogeneous melt by a rapid solidification process.

14. The anode of claim 9, being made by physical vapor deposition.

15. The anode of claim 9, being in the form of a thin film.

16. The anode of claim 9, being made in the form of plates.

17. An anode comprising an oxide dielectric film grown anodically on a homogenous metallic glass alloy having the chemically formula:

$$(M_{1-a}X_a)_b Be_c Y_d Z_e$$

wherein M is Ti, Zr, Ta, or Hf;
X is Nb, Ta, or Hf; X is not same element as M;
Y is at least one of Ti, Zr, Ta, Nb, or Hf;
Y is not the same element as M and/or X; and
Z is at least one of Si, W, V, or Mo,
where a is an atomic fraction of a whole and between about 0.1 and about 0.9
b is about 35 atomic % to about 80 atomic %,
c is about 20 atomic % to about 65 atomic %,
d is between 0 and about 10 atomic %, and
e is an amount between 0 and about 10 atomic %.

18. The anode of claim 17, the anode being configured for electric energy storage.

19. The anode of claim 17, the alloy being a substantially amorphous alloy.

* * * * *

UNITED STATES PATENT AND TRADEMARK OFFICE
CERTIFICATE OF CORRECTION

| | |
|---|---|
| PATENT NO. | : 9,905,367 B2 |
| APPLICATION NO. | : 14/713843 |
| DATED | : February 27, 2018 |
| INVENTOR(S) | : Gerhard E. Welsch, Donald M. McGervey and Dong Myoung Lee |

Page 1 of 1

It is certified that error appears in the above-identified patent and that said Letters Patent is hereby corrected as shown below:

In the Specification

Please replace with the following paragraph starting at Line 11, Column 1:
--GOVERNMENT FUNDING
This invention was made with government support under grant(s) DE-AR0000116 awarded by the Department of Energy. The government has certain rights in the invention.--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*